(12) United States Patent
Arai et al.

(10) Patent No.: US 6,661,420 B2
(45) Date of Patent: Dec. 9, 2003

(54) THREE-DIMENSIONAL SKELETON DATA COMPRESSION APPARATUS

(75) Inventors: Masatoshi Arai, Kanagawa (JP); Ryosuke Miyata, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 264 days.

(21) Appl. No.: 09/847,409

(22) Filed: May 3, 2001

(65) Prior Publication Data

US 2001/0026278 A1 Oct. 4, 2001

Related U.S. Application Data

(63) Continuation of application No. PCT/JP98/06020, filed on Dec. 28, 1998.

(51) Int. Cl.[7] .............................................. G06T 15/00
(52) U.S. Cl. ...................... 345/474; 345/475; 345/420; 345/670
(58) Field of Search ............................... 345/473, 474, 345/475, 420, 629, 670

(56) References Cited

U.S. PATENT DOCUMENTS 5,909,218 A  6/1999  Naka et al.

FOREIGN PATENT DOCUMENTS

| JP | 10-40418 | 2/1998 |
| JP | 10-340354 | 12/1998 |

OTHER PUBLICATIONS

Noshioka, Daisuke et al., "A Study on Difference Transfer Method of Polygonal Animation", Proceeding of the Symposium: DICOMO (multimedia, decentralization, cooperation and mobile) (Jul. 1998) (with translation).

*Primary Examiner*—Mark Zimmerman
*Assistant Examiner*—Kimbinh T. Nguyen
(74) *Attorney, Agent, or Firm*—Staas & Halsey LLP

(57) ABSTRACT

The present invention relates to a three-dimensional skeleton data compression apparatus for compressing a skeleton data amount without degrading rendering quality of a three-dimensional object. A weight detecting part detects weight information that is a numerical value obtained from input skeleton data, showing a degree of the influence of the movement of a skeleton on a vertex, and a weight compressing part deletes a value equal to or lower than a predetermined threshold value. The skeleton compressing part conducts first skeleton compression with respect to a skeleton having no polygon vertex in which an effective weight value is set. The skeleton compressing part also detects relative movement between skeletons, and second skeleton compression is performed to reduce/integrate a skeleton group integrated without relative movement into a unified skeleton. If required, masks are put on skeletons that are not to be subjected to skeleton compression. A polygon file is generated based on compression skeleton data, model information of a polygon and a texture, and scenario information.

16 Claims, 10 Drawing Sheets

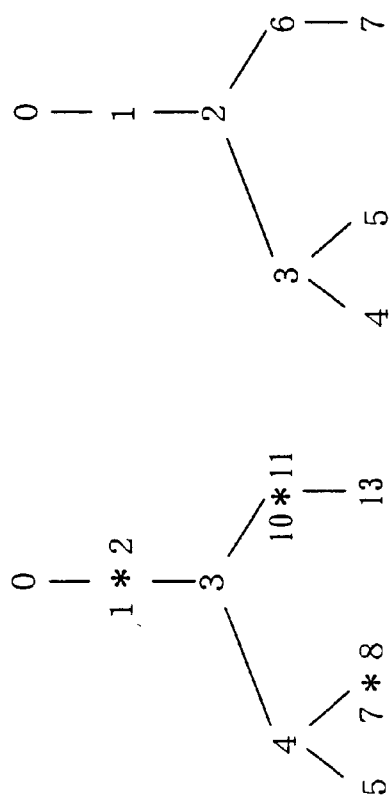
FIG. 8B
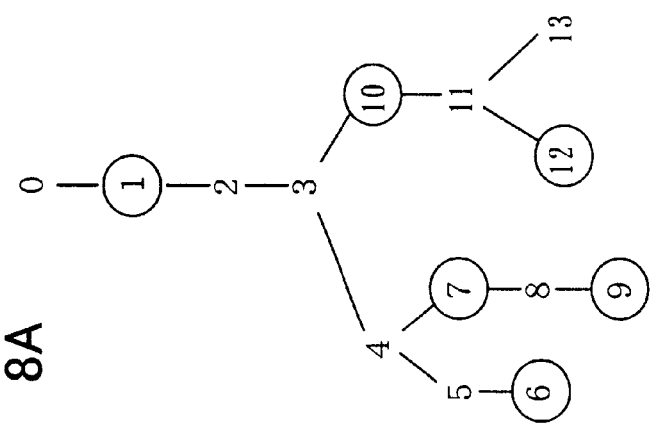
FIG. 8C
FIG. 8A

In the case where a weight is (100, 0)

In the case where a weight is (0, 100)

THREE-DIMENSIONAL SKELETON DATA COMPRESSION APPARATUS

This application is a continuing application, filed under 35 U.S.C. §111(a), of International Application PCT/JP98/06020, filed Dec. 18, 1998.

TECHNICAL FIELD

The present invention relates to an apparatus for displaying a character of three-dimensional (three-dimensional) computer graphics by relating a skeleton that describes a framework to polygon data that describes an outer surface, and in particular, to a three-dimensional skeleton data compression apparatus capable of efficiently compressing skeleton data.

BACKGROUND ART

Due to the recent enhanced performance of computer systems and development of a multimedia processing technique, an environment allowing even a personal computer or the like to process sophisticated three-dimensional computer graphics (hereinafter, abbreviated as a "CG") is being established, and a graphic accelerator board and the like dedicated to processing of a three-dimensional CG are being provided.

There are various types of data formats of a three-dimensional CG. In a game involving the movement of a character such as an artificial creature and an object, generally, data on an object is held mainly in a polygon format, and regarding a rendering process, a texture is attached to a generated polygon mesh, whereby high-speed rendering processing is conducted.

The polygon is obtained by relating positional information of polygon vertexes to texture information that is a graphic pattern, and forms an outer surface of a three-dimensional character such as an artificial creature. The polygon is data for forming a mesh-shaped wire-frame model by disposing polygon vertexes on the outer surface of a three-dimensional object model designed by an animator so that changes in an outside shape are understood, and connecting each polygon vertex, and is related to texture information describing the pattern of an outer surface.

As described above, in the case where data is held in a polygon format, as the number of polygons that can be assigned to an object is larger, CG processing of higher quality will be achieved. In a recent entertainment application, there is a demand for a high quality rendering. It is not rare that more than 2,000 polygons are assigned to a three-dimensional character in order to satisfy user's needs. It is a demanding task to describe the movement/deformation on a polygon vertex basis, so as to provide a three-dimensional object described by a large number of polygons with movement/deformation information in accordance with each scene. Therefore, an idea of a skeleton is introduced. If the movement of a three-dimensional character such as an artificial creature is expressed by a skeleton that is to be a framework thereof, and polygon data that is to be an outer surface is related to the skeleton, it becomes easy to conduct polygon deformation processing. This is because, in general, an artificial creature also has joints conceptually, and its skeleton is mostly operated with respect to the joints. The movement of an artificial creature on a scene basis is described as changes in a skeleton. Since each skeleton is related to polygon vertexes forming the outside shape, the movement of each polygon vertex can be described and calculated based on the movement of the skeleton.

The relationship between the skeleton data and the polygon data will be briefly described with reference to FIG. 10. As shown in FIG. 10, it is assumed that a skeleton 101 and a skeleton 102 are connected to each other via a joint and relatively rotatable. A polygon vertex 110 will be exemplified. The relationship between the polygon vertex and the skeleton is described by a numerical value such as weight information. The weight information is a numerical value showing a degree of the influence of the movement of the skeleton on the polygon vertex. For example, in the case where weight is 100, the polygon vertex moves 100% in accordance with the movement of the skeleton, and in the case where weight is 0, even if the skeleton is changed, the polygon vertex will neither be influenced nor changed. As shown in FIG. 10(a), it is assumed that the weight information of the polygon vertex 110 is set at "100" with respect to the skeleton 101 and at "0" with respect to the skeleton 102. It is assumed that the XYZ coordinate of the polygon vertex 110 at a scene 1 is (X0, Y0, Z0). Then, the skeleton 102 is rotated in accordance with the development of the scene so as to be moved to a position represented by 102a. In this example, the polygon vertex 110 is 100% dependent upon only the skeleton 101, and an influence thereon by the movement of the skeleton 102 is set at "0". Therefore, the coordinate of the polygon vertex 110 remains at (X0, Y0, Z0). On the other hand, as shown in FIG. 10(b), in the case where the weight information of the polygon vertex 110 is set at "0" with respect to the skeleton 101 and at "100" with respect to the skeleton 102, when the skeleton 102 is rotated so as to be moved to a position represented by 102a, the polygon vertex 110 is 100% dependent upon only the skeleton 102, and is rotated in accordance with the rotation of the skeleton 2 to take coordinate (X1, Y1, Z1). In this manner, if the weight information of a polygon vertex is provided to skeleton data, it is not required to give movement/deformation information to all the polygon vertexes individually, with respect to the movement/deformation of a three-dimensional object. Therefore, when the movement/deformation information of a skeleton is given, the movement of a polygon vertex can be described, and the movement of a three-dimensional character can be described.

As described in the prior art, by using skeleton data, the movement of a three-dimensional character can be described on a skeleton basis, and an apparatus user such as an animator can more easily describe an animation scene. However, there arises a problem that enormous amount of calculation processing is involved for deformation processing of a three-dimensional character based on skeleton data. More specifically, it is required to conduct enormous amount of matrix calculation for actually moving/deforming a skeleton based on the information of movement/deformation of the skeleton and conducting movement/deformation processing with respect to a corresponding polygon vertex based on the weight information. As the number of skeletons and polygon vertexes becomes larger, its calculation cost is increased. It is difficult for a personal computer or home game equipment to absorb a calculation cost. Therefore, the number of polygons of a three-dimensional character model is limited and rendering processing ability of a three-dimensional character at each scene is not sufficient; consequently, rendering processing with smooth and natural movement cannot be conducted.

Thus, according to the three-dimensional object rendering processing that adopts a skeleton, performance and quality are determined depending upon the calculation processing ability of a platform. Therefore, in the case where a three-dimensional object is displayed in real time, it is an important technique to reduce a data amount regarding skeleton data so as to decrease a calculation processing amount.

DISCLOSURE OF INVENTION

The present invention has been achieved in order to overcome the problems of three-dimensional object rendering using skeleton data of the prior art, and its object is to provide a three-dimensional skeleton data compression processing apparatus capable of compressing a data amount regarding skeleton data so as to decrease a calculation amount, and ensuring smooth and natural movement of a three-dimensional object without degrading a rendering quality thereof.

In order to achieve the above-mentioned object, a three-dimensional skeleton data compression processing apparatus of the present invention is a skeleton data compression apparatus for compressing and holding skeleton data, used in a three-dimensional polygon display apparatus that renders a three-dimensional character described by polygon data and skeleton data, including: a weight detecting part for detecting weight information that is a numerical value representing a relationship between a skeleton and a polygon vertex and showing a degree of an influence of movement of the skeleton on the vertex, based on input skeleton data; a weight compression threshold value setting part for setting a weight compression threshold value that is set by a user and used for deleting weight information equal to or lower than the numerical value as the weight information having a small degree of an influence involved in the movement of the skeleton; and a weight compressing part for reducing/compressing weight information equal to or lower than the set weight compression threshold value, among weight information detected by the weight detecting part.

Because of the above-mentioned configuration, a weight value is deleted, which shows an actually ignorable influence of the movement of a skeleton on polygon data in rendering, whereby weight information can be compressed to reduce a data amount substantially without degrading rendering quality of a three-dimensional character.

Next, it is preferable that the three-dimensional skeleton data compression processing apparatus of the present invention includes a first skeleton compressing part for reducing/compressing a skeleton having no polygon vertex with a weight value and having no polygon vertex influenced by movement of the skeleton, after the weight compression by the weight compressing part,.

Because of the above-mentioned configuration, skeleton data having no polygon vertex influenced by the movement of the skeleton can be reduced and compressed, and a data amount can be reduced substantially without degrading rendering of a three-dimensional character. Examples of a skeleton having no polygon vertex influenced by the movement of a skeleton include a joint, a contact point, and the like virtually provided in a three-dimensional artificial creature. Regarding polygon data that is an outer surface, in the case where, for example, an arm of an artificial creature is moving, it can be described that a polygon vertex is moving, depending upon a skeleton of a bone portion of an upper arm and a skeleton of a bone portion of a lower arm, and the polygon vertex does not directly depend upon an elbow joint.

Next, in the three-dimensional skeleton data compression processing apparatus of the present invention, it is preferable that the weight detection by the weight detecting part, the weight compression by the weight compressing part, and the skeleton compression by the first skeleton compressing part are conducted on each scene describing a series of movements of a three-dimensional character, and a compressible skeleton having less movement is dynamically determined on each scene to compress skeleton data.

Because of the above-mentioned configuration, compressible skeleton data can be compressed dynamically on a scene basis, and a data mount can be further reduced in accordance with a scene.

Next, it is preferable that the three-dimensional skeleton data compression processing apparatus of the present invention includes a skeleton relative movement detecting part for detecting relative movement between skeletons and detecting a skeleton group that moves as one body without relative movement, and a second skeleton compressing part for reducing/integrating skeletons, detected by the skeleton relative movement detecting part to be the skeleton group that moves as one body, into a unified and integrated skeleton on a scene basis describing a series of movements of a three-dimensional character, thereby reducing/compressing a number of skeletons.

Because of the above-mentioned configuration, skeletons without relative movement can be integrated to reduce the number of skeletons, thereby compressing skeleton, in accordance with the movement of a three-dimensional character on a scene basis, and a data amount can be reduced without degrading substantially rendering quality of a three-dimensional character. For example, when a scene in which an artificial creature walks is compared with a scene in which an artificial creature stands and nods, in the scene in which an artificial creature walks, a number of skeletons relatively move. Therefore, in order to render smooth and natural movement, it is preferable not to excessively reduce skeleton data. However, in the scene in which an artificial creature stands and nods, a portion below the chest can be described as one integrated skeleton; therefore, even if a data amount is reduced by decreasing the number of skeletons, the scene will not be visually degraded. Thus, a compressible skeleton is dynamically determined in accordance with an action scene, whereby skeleton data is compressed.

Next, it is preferable that the three-dimensional skeleton data compression processing apparatus of the present invention includes a skeleton compression mask setting part for specifying a particular skeleton so that it will not be a target for skeleton compression, wherein, even in a case where the skeleton specified by the skeleton compression mask setting part is determined to be a target for skeleton compression, the specified skeleton is not subjected to the skeleton compression.

Because of the above-mentioned configuration, a particular skeleton can be prevented from being compressed by mask setting by an animator or the like, even if it satisfies the condition of skeleton compression, and flexible skeleton compression processing can be conveniently realized.

Next, it is preferable that the three-dimensional skeleton data compression processing apparatus of the present invention includes a polygon file creating part for sorting and editing polygon data in accordance with a scene progression and a change thereof in a time series, based on skeleton data and polygon data after the skeleton compression, thereby creating a polygon file executable in a three-dimensional polygon display apparatus.

Because of the above-mentioned configuration, skeleton data and polygon data subjected to weight compression and skeleton compression can be edited as a polygon file in accordance with a scene progression by using the three-dimensional skeleton data compression apparatus of the present invention, and rendering reproduction in the three-dimensional polygon display apparatus can be conducted.

Next, it is preferable that the three-dimensional skeleton data compression processing apparatus of the present invention includes an animation creating part for creating each frame data by executing a rendering based on skeleton data and polygon data after the skeleton compression, followed by sorting in a time series, thereby creating animation data.

Because of the above-mentioned configuration, an image can be obtained on a frame basis by conducting rendering processing based on skeleton data and polygon data subjected to weight compression and skeleton compression, and animation data can be created as a motion image, by using the three-dimensional skeleton data compression apparatus of the present invention, Next, the computer-readable recording medium of the present invention is a computer-readable storage medium storing a processing program for realizing a skeleton data compression apparatus for compressing and holding skeleton data, used in a three-dimensional polygon display apparatus for rendering a three-dimensional character described by polygon data and skeleton data, including: a weight detection processing operation of detecting weight information that is a numerical value representing a relationship between a skeleton and a polygon vertex and showing a degree of an influence of movement of the skeleton on the vertex, based on input skeleton data; a weight compression threshold value setting processing operation of setting a weight compression threshold value that is set by a user and used for deleting weight information equal to or lower than the numerical value as the weight information having a small degree of an influence involved in the movement of the skeleton; a weight compression processing operation of reducing/compressing weight information equal to or lower than the set weight compression threshold value, among weight information detected by the weight detection processing operation; and a first skeleton compression processing operation of reducing/compressing a skeleton having no polygon vertex with a weight value and having no polygon vertex influenced by movement of the skeleton, after the weight compression by the weight compression processing operation.

Because of the above-mentioned configuration, a processing program is loaded onto a computer, whereby a three-dimensional skeleton data compression apparatus for reducing/compressing compressible skeleton data can be configured by using a personal computer or the like.

Furthermore, the computer-readable recording medium of the present invention is a computer-readable storage medium storing a processing program for realizing a skeleton data compression apparatus for compressing and holding skeleton data, used in a three-dimensional polygon display apparatus for rendering a three-dimensional character described by polygon data and skeleton data, including: a weight detection processing operation of detecting weight that is a numerical value representing a relationship between a skeleton and a polygon vertex and showing a degree of an influence of movement of the skeleton on the vertex, based on input skeleton data; a weight compression threshold value setting processing operation of setting a weight compression threshold value that is set by a user and used for deleting weight information equal to or lower than the numerical value as the weight information having a small degree of an influence involved in the movement of the skeleton; a weight compression processing operation of reducing/compressing weight information equal to or lower than the set weight compression threshold value, among weight information detected by the weight detection processing operation; a skeleton relative movement detection processing operation of detecting relative movement between skeletons and detecting a skeleton group that moves as one body without relative movement; and a second skeleton compression processing operation of reducing/integrating skeletons, detected by the skeleton relative movement detecting part to be the skeleton group that moves as one body, into a unified and integrated skeleton on a scene basis describing a series of movements of a three-dimensional character, thereby reducing/compressing a number of skeletons.

Because of the above-mentioned configuration, a processing program is loaded onto a computer, whereby a three-dimensional skeleton data compression apparatus for integrating a compressible skeleton group to compress skeleton data can be configured by using a personal computer or the like.

BRIEF DESCRIPTION OF DRAWINGS

FIG. 8 is a diagram showing examples of a change in a skeleton ID and a change in a parenthood relationship, and compression history information before and after skeleton compression processing.

BEST MODE FOR CARRYING OUT THE INVENTION

Hereinafter, the present invention will be described by way of embodiments.

(Embodiment 1)

Figure 1:
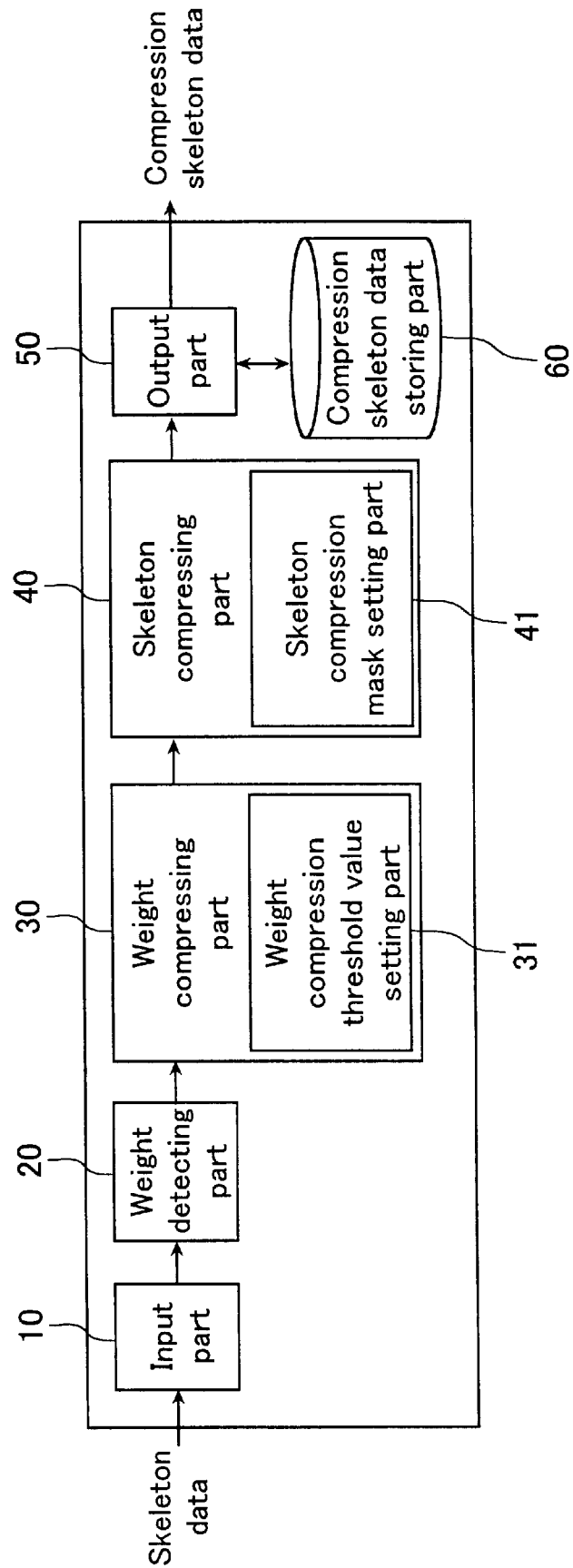
FIG. 1 is a schematic block diagram of a three-dimensional skeleton data compression apparatus of Embodiment 1 according to the present invention.
Figure 2:
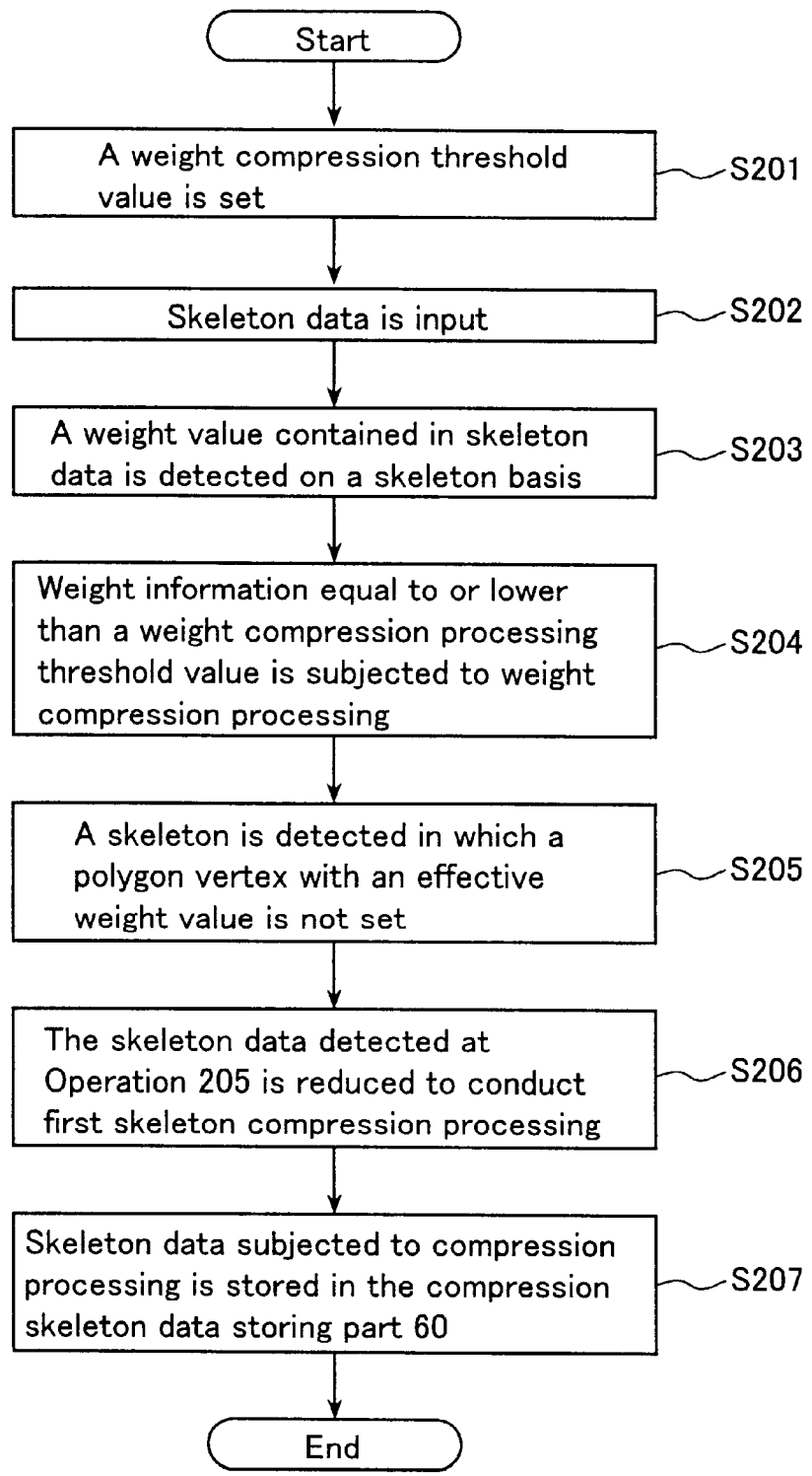
FIG. 2 is a flow chart showing an entire image of a processing flow of the three-dimensional skeleton data compression apparatus of Embodiment 1 according to the present invention.

The outline of an entire configuration of a three-dimensional skeleton data compression apparatus of Embodiment 1 and an entire image of a processing flow in the apparatus will be described with reference to the drawings. The three-dimensional skeleton data compression apparatus of Embodiment 1 conducts three-dimensional skeleton data compression by weight compression and skeleton compression in which compressible skeleton data is detected to reduce/compress the skeleton. FIG. 1 is a schematic block diagram of the apparatus. FIG. 2 shows an entire image of a processing flow of the apparatus as processing operations.

As shown in FIG. 1, the three-dimensional skeleton data compression apparatus of Embodiment 1 mainly includes an input part 10, a weight detecting part 20, a weight compressing part 30, a skeleton compressing part 40, an output part 50, and a compression skeleton data storing part 60. Although not shown in the figure, it is assumed that the apparatus includes a memory, a device, and the like required for control processing of the entire system.

The input part 10 is used for inputting three-dimensional skeleton data based on which compression is conducted, and also provides an interface between the user and the apparatus.

The weight detecting part 20 detects weight information that is a numerical value showing a relationship between the skeleton and the polygon vertex, i.e., a numerical value showing a degree of the influence of the movement of the skeleton on the vertex, based on the input skeleton data.

The weight compressing part 30 includes a weight compression threshold value setting part 31, and sets/holds a weight compression threshold value set by the user. The weight compression threshold value is a threshold value set by the user with respect to a weight value, and is used for rounding off a weight value equal to or lower than the threshold value to 0, considering that these weight values show a small degree of the influence by the movement of a skeleton. The weight compressing part 30 reduces/compresses weight information equal to or lower than a threshold value set by the weight compression threshold value setting part 31, among the weight values detected by the weight detecting part 20.

The skeleton compressing part 40 detects a compressible skeleton, and conducts skeleton compression processing. FIG. 8(*a*) briefly shows a concept of reduction of a skeleton by skeleton compression. Numbers represent skeleton IDs respectively assigned to skeletons, and skeleton ID numbers surrounded by circles represent compressible skeletons. In this example, skeleton ID numbers "1", "6", "7", "9", "10", and "12" are compressible skeletons. As shown on the left side of FIG. 8(*b*), skeletons are reduced/compressed. In the case where a compressible skeleton has a lower-level skeleton that is not to be subjected to skeleton compression, the information on the compressible skeleton should be taken over to the information on the lower-level skeleton. A matrix operation is conducted between the compressible skeleton data and the lower-level skeleton data to allow the information to be taken over, and the compressible skeleton data is integrated with the lower-level skeleton data, whereby the skeleton is reduced/compressed. The above-mentioned skeleton compression processing is conducted with respect to skeleton ID numbers "1", "7", and "10" in FIG. 8(*b*). Furthermore, in the case where a compressible skeleton does not have a lower-level skeleton that is not to be subjected to skeleton compression, for example, in the case of skeleton ID numbers "6" and "9" in FIG. 8(*b*), it is not required to allow the information to be taken over to the lower-level skeleton, so that the skeleton is reduced/compressed as it is. After conducting skeleton compression processing, as shown on the right side of FIG. 8(*b*), skeleton ID numbers are assigned based on a new skeleton relationship after compression as shown on the right side of FIG. 8(*b*). As described later, the skeleton compression is classified into two compression processings: first skeleton compression processing and second skeleton compression processing, depending upon a detection method and condition for determining skeleton compressibility. In Embodiment 1, the skeleton compressing part 40 conducts first skeleton compression processing.

Furthermore, it is preferable that the skeleton compressing part 40 also generates compression history information. As shown in FIGS. 8(*a*) and 8(*b*), in the case where skeleton compression is conducted, the number of skeletons is changed before and after compression, and a skeleton ID assigned to each skeleton is also changed before and after compression. Furthermore, in skeleton data, a parenthood relationship between skeletons is generally described, and it is required to hold information on the parenthood relationship before and after skeleton compression. In view of these points, compression history information is generated, in which a change in a correspondence relationship between skeletons before and after compression is understood, as shown in FIG. 8(*c*).

It is preferable that the skeleton compressing part 40 includes the skeleton compression mask setting part 41 so as to specify a skeleton that is not to be subjected to skeleton compression even in the case of satisfying the condition of specifying a particular skeleton and conducting skeleton compression. The reason for this is to allow the user to conduct control instruction of minute processing.

The output part 50 is used for outputting skeleton data and compression history information after weight compression processing and skeleton data compression processing.

Furthermore, the compression skeleton data storing part 60 is a storage apparatus for storing skeleton data and compression history information after weight compression processing and skeleton data compression processing in the apparatus.

A processing flow of the three-dimensional skeleton data compression apparatus of the present invention configured as described above is mainly composed of weight compression processing and skeleton compression processing.

First, the principle of the weight compression processing will be described with reference to a flow chart in FIG. 2. For the weight compression processing, a weight compression processing threshold value is set in the weight compression processing threshold value setting part 31 (Operation 201). The weight compression processing threshold value is a numerical value for rounding off weight information describing only a substantially ignorable influence of a skeleton on a polygon vertex. The weight compression processing threshold value can be freely set by the user. However, it is preferable that the weight compression processing threshold value is tuned by visual confirmation of degradation of rendering quality in later rendering execution results, trial and error, or an empirical rule.

Next, skeleton data created by an animator before compression processing is input from the input part 10, together with data on a display object such as a name of an object to be displayed, a display position, and a resolution (Operation 202). Herein, information on an allowable data amount for assignment that can be assigned to the object may be input together with the data. Specifically, this refers to information on a data amount that can be assigned to each object, in the case where there are a plurality of objects appearing in a scene. In order to satisfy the allowable data amount for assignment, a compression ratio of weight compression processing and skeleton compression processing can be set.

Next, the weight detecting part 20 detects a weight value contained in the skeleton data input from the input part 10 on a skeleton basis (Operation 203). It is preferable that the detected results are held/managed as a skeleton-weight table in which a polygon vertex having weight information with respect to the skeleton is related to a weight value thereof, on a skeleton basis.

Next, the weight compressing part 30 refers to the skeleton-weight table generated in Operation 203, compares the weight compression processing threshold value set by the weight compression processing threshold value setting part 31 with each weight value, and reduces the weight information with respect to a polygon vertex having a weight value equal to or lower than the weight compression processing threshold value, thereby conducting weight compression processing (Operation 204). More specifically, it is assumed that the polygon vertex is not weighted with respect to the skeleton. Because of the weight reduction processing in Operation 204, a data amount can be reduced, and visual degradation of rendering reproduction can be ignorable.

Next, the principle of the skeleton compression processing will be described.

For convenience, it is assumed that the skeleton compression processing described below in Embodiment 1 is first skeleton compression processing. This is called as such for convenience sake in order to discriminate it from another skeleton compression processing described later in Embodiment 2. According to the first skeleton compression processing in Embodiment 1, compressible skeleton data is detected to delete the skeleton and decrease the number of skeletons, whereby a skeleton data amount is compressed. According to the second skeleton compression processing in Embodiment 2 described later, a compressible skeleton group that moves as one body without relative movement is detected, and the skeleton group is integrated to reduce the number of skeletons, whereby a skeleton data amount is compressed.

Next, the skeleton compressing part 40 refers to the skeleton-weight table generated in Operation 203, and detects a skeleton in which a polygon vertex with an effective weight value is not set (Operation 205). More specifically, the skeleton compressing part 40 detects a skeleton in which there is no polygon vertex on an outer surface that is strongly influenced by changes in the skeleton. Herein, examples of such a skeleton are assumed to include those which are provided for creating a skeleton model of an artificial creature, i.e., a skeleton for describing the movement of only an inside of an object or another skeleton, and more specifically, a joint and an internal contact point. For example, in the case where an arm of an artificial creature is moving, it can be described that a polygon vertex on an outer surface of the arm is moving depending upon a skeleton of a bone portion of an upper arm and a skeleton of a bone portion of a lower arm. The weight on the skeletons of the bone portions of the upper and lower arms is set to be very high. However, this movement does not directly depend upon an elbow joint, so that a weight value on the elbow joint is set to be low.

Next, the skeleton data on the skeleton detected in Operation 205 is reduced, whereby the first skeleton compression processing is conducted (Operation 206). In the above-mentioned example, in the case where there is no polygon vertex with substantially effective weight information with respect to the skeleton of the elbow joint, skeleton data on the skeleton of the elbow joint is reduced to compress a skeleton data amount.

Next, the skeleton data subjected to compression processing is stored in the compression skeleton data storing part 60 (Operation 207).

As described above, in the three-dimensional skeleton data compression apparatus of Embodiment 1, due to the weight compression processing and the skeleton data compression processing in accordance with the above-mentioned Operations 201 to 207, a three-dimensional skeleton data amount can be compressed, and natural and smooth movement of a three-dimensional character can be ensured almost without visual degradation of the movement of a three-dimensional character after compression.

It is also possible that the weight compression threshold value setting part 31 has a function of automatically adjusting a weight compression processing threshold value so as to satisfy an allowable data amount for assignment that can be assigned to the character. This can be realized as follows: processing in Operations 201 to 207 is conducted in accordance with an initial set value to investigate a data amount of the execution results; in the case where the data amount does not satisfy an allowable data amount for assignment, an over amount is controlled by feedback, whereby a weight compression processing threshold value is adjusted.

(Embodiment 2)

A three-dimensional skeleton data compression apparatus of Embodiment 2 according to the present invention will be described with reference to the drawings. The three-dimensional skeleton data compression apparatus of Embodiment 2 dynamically conducts three-dimensional skeleton data compression in accordance with the movement of a three-dimensional character on a scene basis by weight compression and second skeleton compression in which a compressible skeleton group that moves as one body without relative movement is detected, and the skeleton group is integrated to reduce the number of skeletons, whereby a skeleton data amount is compressed. Herein, as an example showing dynamic processing in accordance with the movement of a three-dimensional character on a scene basis, a scene in which an artificial creature walks is compared with a scene in which an artificial creature stands and nods.

Figure 3:
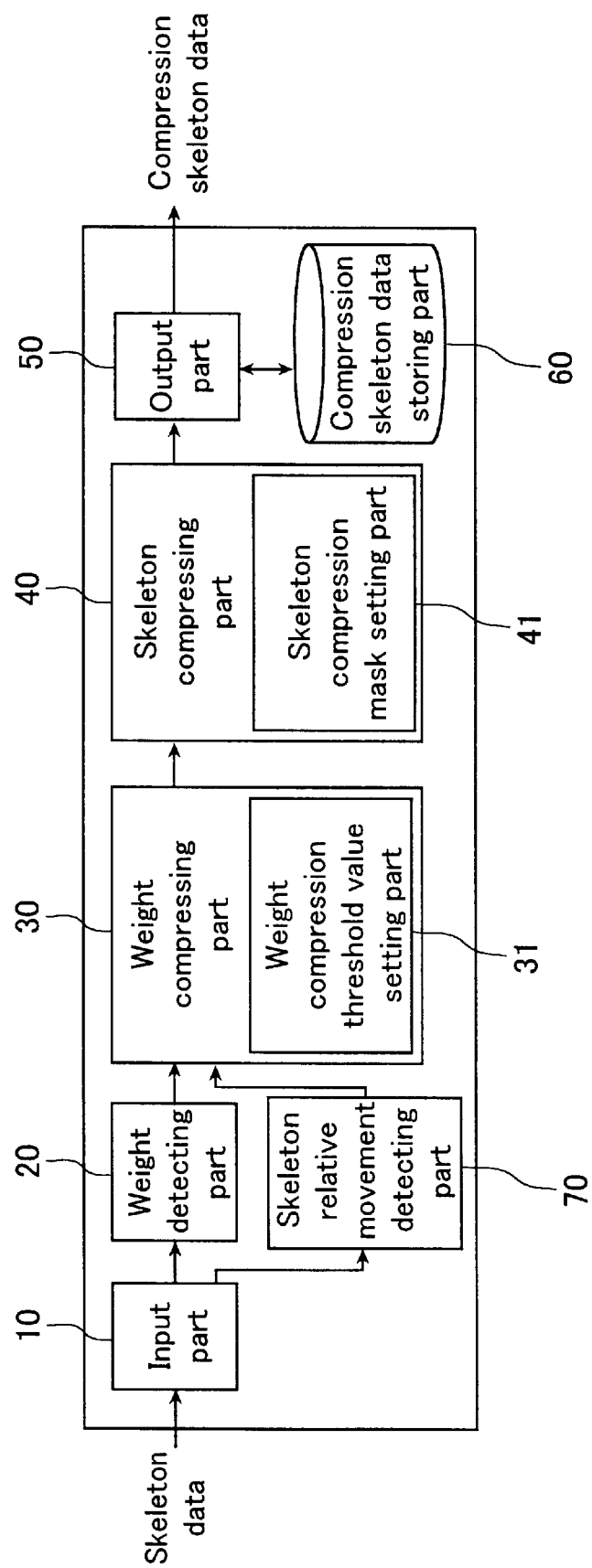
FIG. 3 is a schematic block diagram of a three-dimensional skeleton data compression apparatus of Embodiment 2 according to the present invention.
Figure 4:
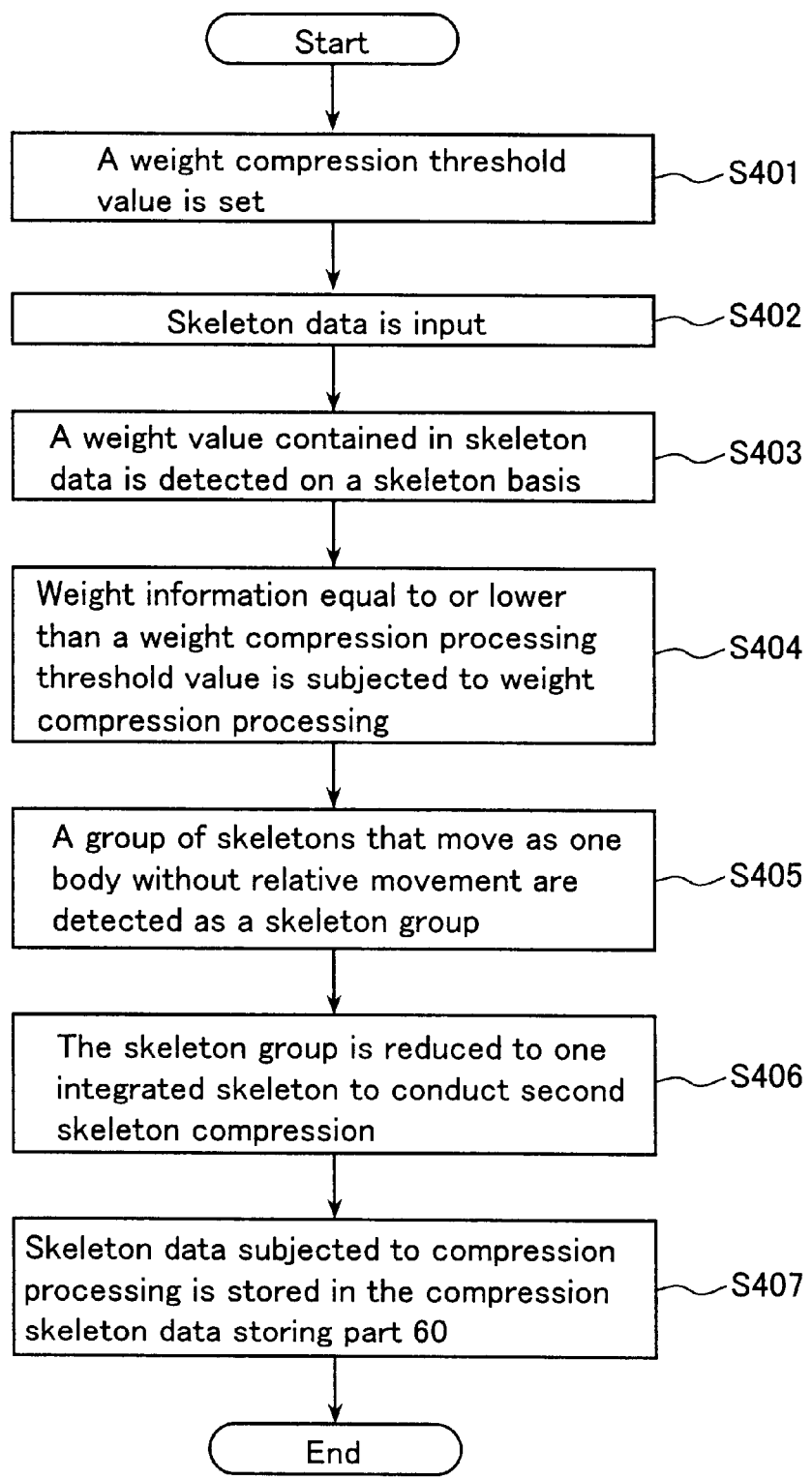
FIG. 4 is a flow chart showing an entire image of a processing flow of a three-dimensional skeleton data compression apparatus of Embodiment 2 according to the present invention.

FIG. 3 shows a schematic block diagram of the apparatus. FIG. 4 shows an entire image of a processing flow of the apparatus as processing operations.

As shown in FIG. 3, the three-dimensional skeleton data compression apparatus of Embodiment 2 mainly includes a skeleton relative movement detecting part 70, as well as an input part 10, a weight detecting part 20, a weight compressing part 30, a skeleton compressing part 40*a*, an output part 50, and a compression skeleton data storing part 60. Although not shown in the figure, it is assumed that the apparatus includes a memory, a device, and the like required for control processing of the entire system. The components denoted by the same reference numerals as those in FIG. 1 described in Embodiment 1 have the same functions as those in Embodiment 1. Therefore, the description thereof will be omitted for convenience.

The skeleton relative movement detecting part 70 detects the relative movement between skeletons in a series of scenes. It can be detected that a skeleton group, of which relative movement is not detected, moves as one body.

In the same way as in the skeleton compressing part 40 in Embodiment 1, the skeleton compressing part 40*a* detects compressible skeletons, and conducts skeleton compression processing. In Embodiment 2, as described later, second skeleton compression processing is conducted, in which a skeleton group that is determined by the skeleton relative movement detecting part 70 to move as one body is reduced as one skeleton.

Next, processing operations of the three-dimensional skeleton data compression apparatus of Embodiment 2 will be described with reference to FIG. 4. The processing of the three-dimensional skeleton data compression apparatus of Embodiment 2 is mainly composed of weight compression processing and second skeleton compression processing.

Herein, regarding the weight compression processing operations (Operations 401 to 404), in artificial creature's actions of walking and nodding, weighting between the skeleton and the polygon vertex may be varied or it may be the same therebetween. Herein, it is assumed that the weight compression processing operations are not varied depending upon the difference in scenes, and they are the same as the weight compression processing operations (Operations 201 to 204) described in Embodiment 1.

Next, the principle of the second skeleton compression processing will be described.

The skeleton relative movement detecting part 70 investigates the relative movement between skeletons from the description of movement of individual skeletons in a series of scenes, based on skeleton data, and a group of skeletons that move as one body without relative movement are detected as a skeleton group (Operation 405). Regarding a scene in which an artificial creature walks, in order to realize smooth movement, relatively different movements will be described with respect to most of skeletons. However, a scene in which an artificial creature stands and nods can be considered as an integrated skeleton group because the lower part below the neck, for example, does not have relative movement.

The skeleton compressing part 40a reduces a skeleton group, which is detected to be an integrated skeleton group by the skeleton relative movement detecting part 70, into an integrated skeleton to reduce skeleton data, thereby conducting second skeleton compression (Operation 406). In the case of a scene in which an artificial creature stands and nods, a skeleton group below the neck is integrated to be an integrated skeleton, whereby a skeleton data amount is reduced/compressed.

Next, skeleton data subjected to compression processing is stored in the compression skeleton data storing part 60 (Operation 407).

As described above, in the three-dimensional skeleton data compression apparatus of Embodiment 2, due to the weight compression processing and skeleton data compression processing in accordance with the above-mentioned operations 401 to 407, a three-dimensional skeleton data amount can be compressed, and natural and smooth movement can be ensured almost without visual degradation of the movement of a three-dimensional character after compression.

In the above-mentioned description, the skeleton compression processing part 40a conducts only the second skeleton compression processing. However, it is appreciated that the skeleton compression processing part 40a may conduct the first skeleton compression processing described in Embodiment 1 and the second skeleton compression processing described in Embodiment 2. More efficient skeleton data compression can be realized.

(Embodiment 3)

A three-dimensional skeleton data compression apparatus of Embodiment 3 according to the present invention will be described with reference to the drawings. The three-dimensional skeleton data compression apparatus of Embodiment 3 includes a function of creating a polygon file in an execution format of a three-dimensional polygon display apparatus, based on the skeleton data and the polygon data created by the three-dimensional skeleton data compression apparatus of Embodiment 1 or 2, and a function of generating animation data that is a motion image by generating images of respective frames and sorting them in a time series, in addition to the three-dimensional skeleton data compression apparatus of Embodiment 1 or 2.

Figure 5:
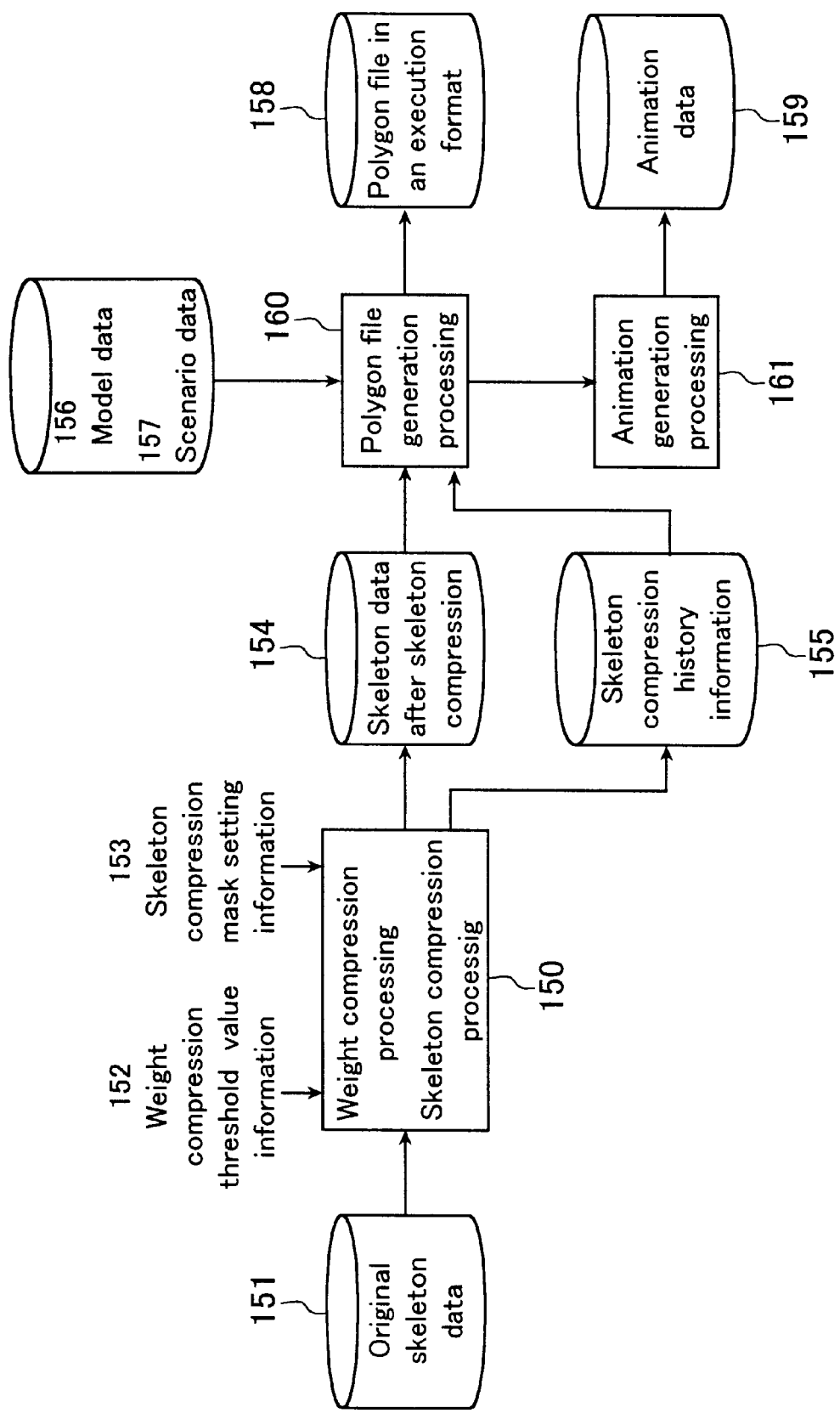
FIG. 5 is a conceptual diagram mainly showing a flow of input data and output data with respect to a three-dimensional skeleton data compression apparatus of Embodiment 3 according to the present invention.

FIG. 5 is a conceptual diagram mainly showing a flow of input data and output data with respect to the three-dimensional skeleton data compression apparatus of Embodiment 3.

In FIG. 5, reference numeral 150 denotes a function provided by the three-dimensional skeleton data compression apparatus, which includes weight compression processing and skeleton compression processing. Reference numeral 151 denotes original skeleton data containing weight value information of polygon vertexes created by a model creator/animator, 152 denotes a weight compression threshold value to be set, 153 denotes skeleton compression mask setting information, 154 denotes skeleton data after compression, 155 denotes compression history information, 156 denotes model data such as polygon data and texture data, 157 denotes scenario data describing the movement of a three-dimensional character which the animator creates in accordance with the progression of a scene, 158 denotes a polygon file in an execution format, and 159 denotes animation data as a motion picture.

Figure 6:
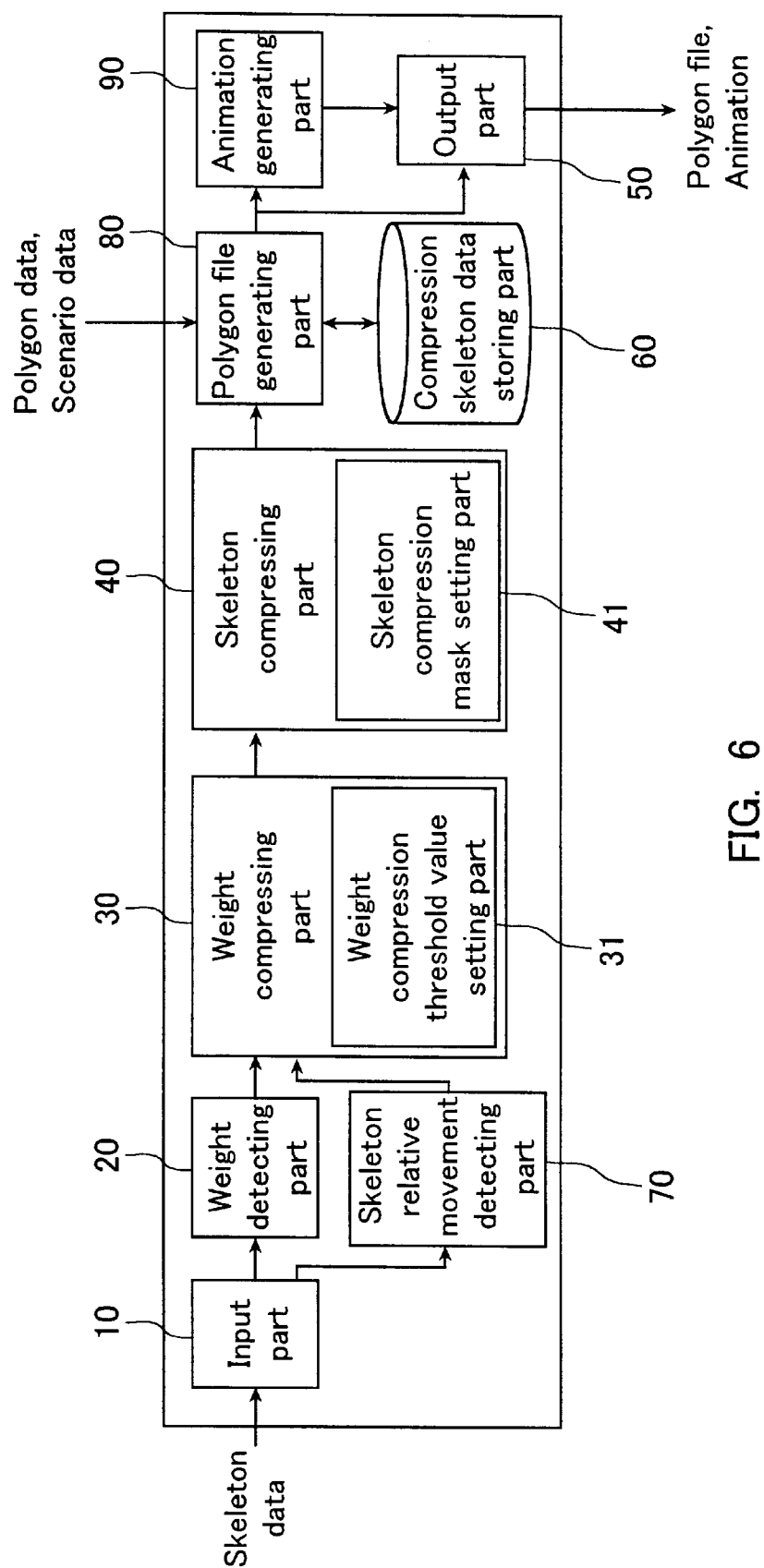
FIG. 6 is a schematic block diagram of the three-dimensional skeleton data compression apparatus of Embodiment 3 according to the present invention.
Figure 7:
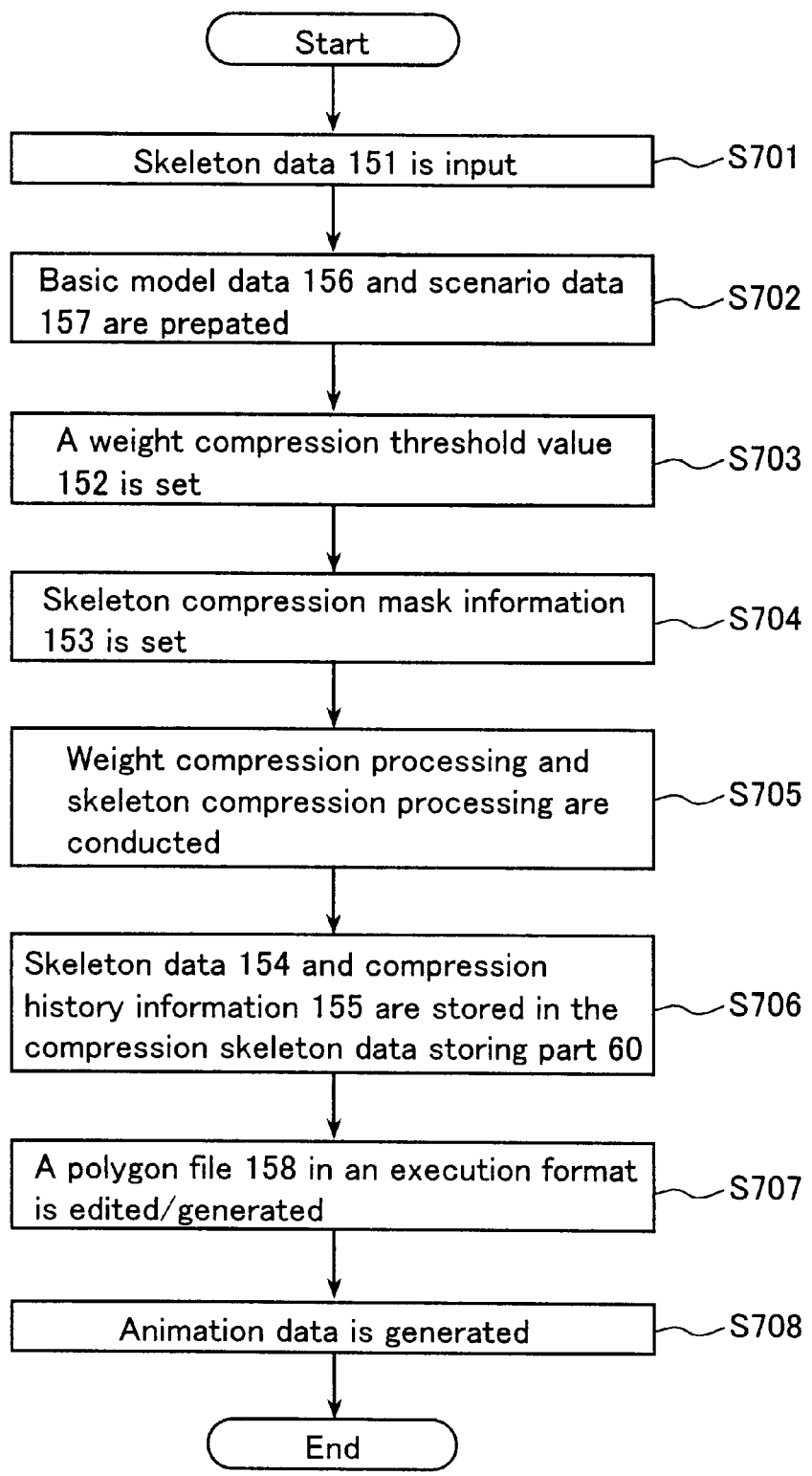
FIG. 7 is a flow chart showing an entire image of a processing flow of the three-dimensional skeleton data compression apparatus of Embodiment 3 according to the present invention.

FIG. 6 is a schematic block diagram of the three-dimensional skeleton data compression apparatus of Embodiment 3. FIG. 7 shows an entire image of a processing flow of the apparatus as processing operations.

As shown in FIG. 6, the three-dimensional skeleton data compression apparatus of Embodiment 2 mainly includes a polygon file generating part 80 and an animation generating part 90, in addition to an input part 10, a weight detecting part 20, a weight compressing part 30, a skeleton compressing part 40a, an output part 50, a compression skeleton data storing part 60, and a skeleton relative movement detecting part 70. Although not shown in the figure, it is assumed that the apparatus includes a memory, a device, and the like required for control processing of the entire system. The components denoted by the same reference numerals as those in FIGS. 1 and 3 have the same functions as those therein. Therefore, the description thereof will be omitted for convenience.

The polygon file generating part 80 extracts the skeleton data 154 after the weight compression processing and the skeleton compression processing described in Embodiments 1 and 2 and the history information 155 of the compression processing from the skeleton compressing part 40, generates a polygon mesh and texture information describing the movement of a three-dimensional character, based on the extracted information 154 and 155 and the scenario data 157, sorts them in a time series, and generate the data 158 in a polygon file format that can be rendered in the three-dimensional polygon data display apparatus (not shown).

The animation generating part 90 creates picture images of respective frames by rendering data in a polygon file format, sorts them in a time series, and generates the animation data 159 as a continuous motion image.

The polygon file generation processing and the animation generation processing of the three-dimensional skeleton data compression apparatus according to the present invention configured as described above will be described with reference to a flow chart in FIG. 7 mainly describing a flow of data.

The basic skeleton data 151 is input (Operation 701). The skeleton data contains information on a skeleton, weight information, and the like.

Next, the basic model data 156 and the scenario data 157 are prepared (Operation 702). The basic model data 156 is model data such as original polygon information and texture information created by the model creator/animator. Furthermore, the scenario data 157 is a basic action of a three-dimensional character which the animator creates in accordance with the progression of a scene, the movement of a skeleton in accordance with progression of a story, a change in texture, and the like.

Next, the weight compression threshold value 152 is set (Operation 703). This refers to setting of a threshold value to be a reference based on which the weight compression described in Embodiment 1 is executed or not. Furthermore, the skeleton compression mask setting information 153 is set, which specifies a skeleton that is not to be subjected to the skeleton compression processing (Operation 704). This is because flexible tuning can be conducted by the instruction of an animator.

Next, the weight compression processing and the skeleton compression processing are conducted based on the above-mentioned input data (Operation 705). The weight compression processing described in Embodiment 1, the first skeleton compression processing, and the second skeleton compression processing described in Embodiment 2 are conducted.

Next, the skeleton data 154 subjected to the compression processing is stored in the compression skeleton data storing part 60. Concurrently, the compression history information 155 is stored as a file in a list format (Operation 706).

Next, the polygon file 158 in a rendering execution format is edited/generated by the polygon file generation processing 160 (Operation 707). The polygon file 158 in a rendering execution format is edited/generated, which describes the movement of a three-dimensional character in a time series by using a texture attached to a polygon mesh, based on the skeleton data 154 subjected to compression processing, the compression history information 155, the model data 156 such as polygon data and texture data, and the scenario data 157.

Then, the animation generating part 90 generates animation data based on the polygon file 158 in a rendering execution format (Operation 708). The animation generating part 90 executes a rendering based on the polygon file 158 in a rendering execution format to generate images of respective frames, sorts them in a time series, and generates animation data as a continuous motion image.

As described above, the three-dimensional skeleton data compression apparatus of Embodiment 3 can generate a polygon file in a format that is executable in the three-dimensional polygon data display apparatus, using the three-dimensional skeleton data compressed by the weight compression processing and the skeleton data compression processing, and can generate animation data as a continuous motion image.

A platform of the three-dimensional polygon data display apparatus that executes a rendering of three-dimensional polygon data, using the polygon file generated in Embodiment 3 may be integrated with the three-dimensional skeleton data compression apparatus of the present invention. It is also appreciated that another three-dimensional polygon data display apparatus may be used as long as data can be transferred.

(Embodiment 4)

Figure 9:
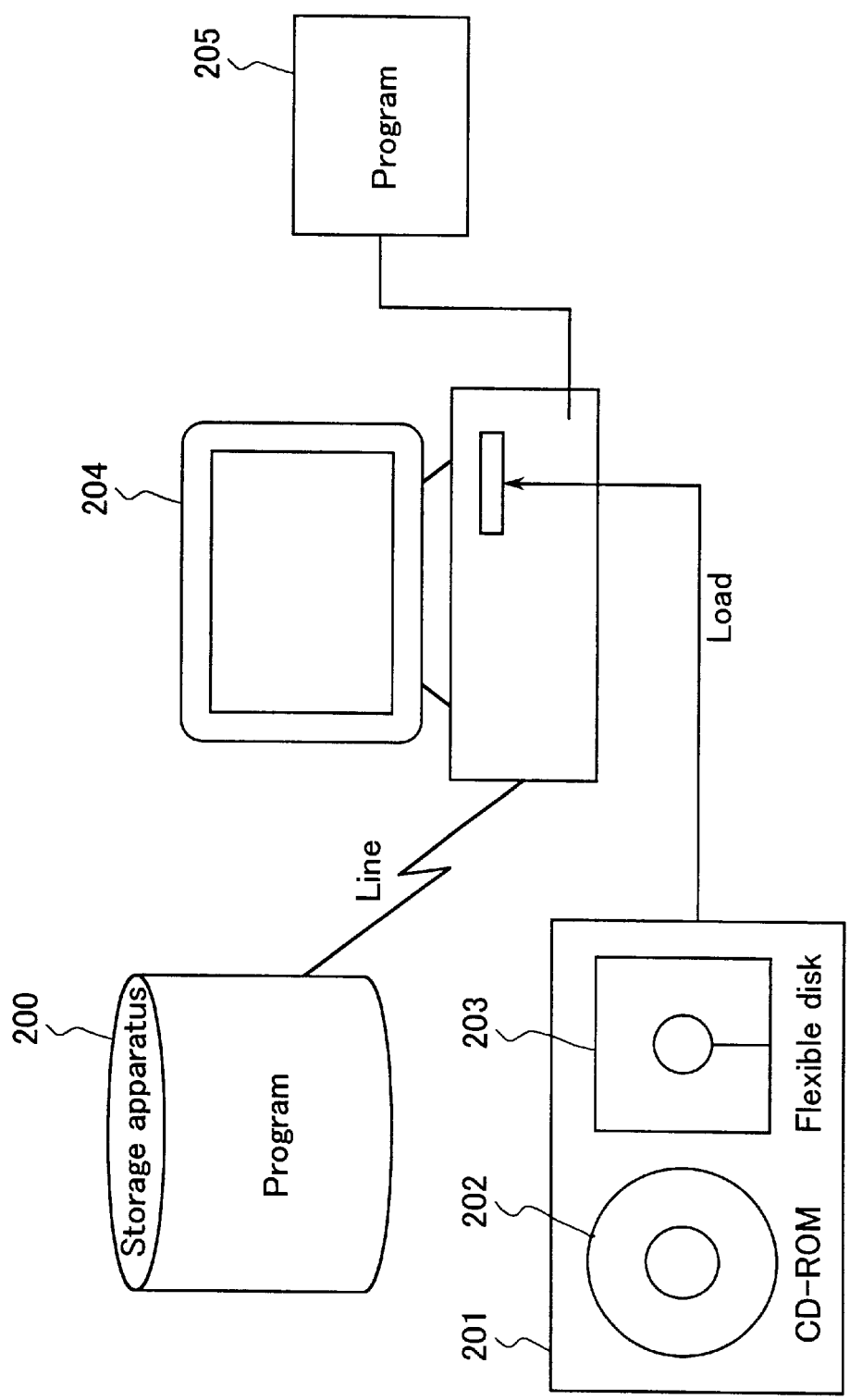
FIG. 9 shows examples of recording media storing a program of three-dimensional skeleton data compression processing operations of Embodiment 4 according to the present invention.
Figure 10A:
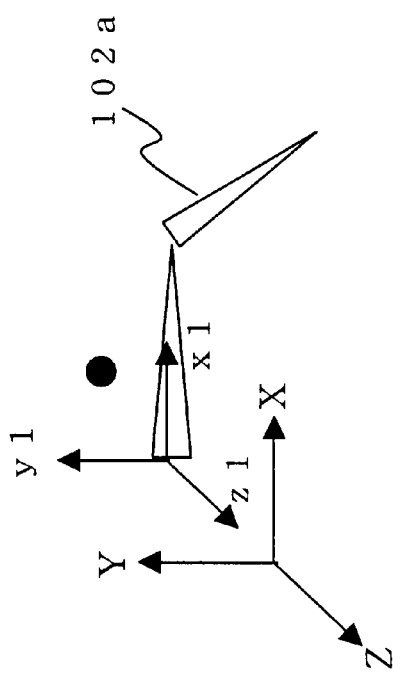
FIG. 10 shows a relationship between the skeleton data and the polygon data in the prior art.
Figure 10A:
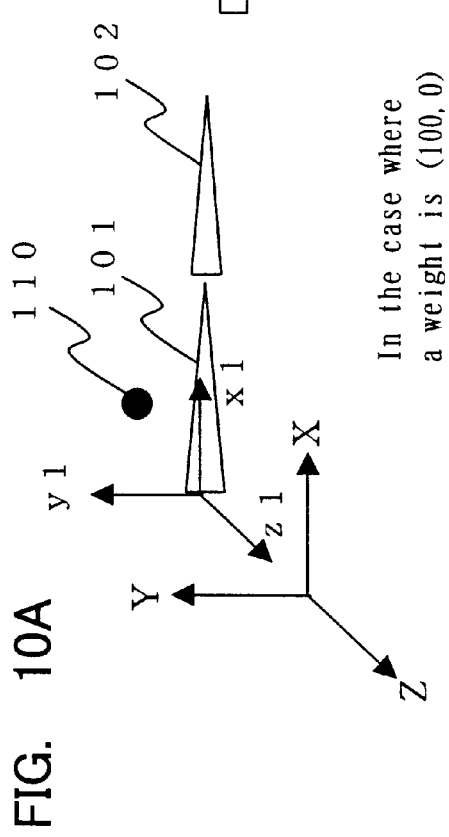
Figure 10B:
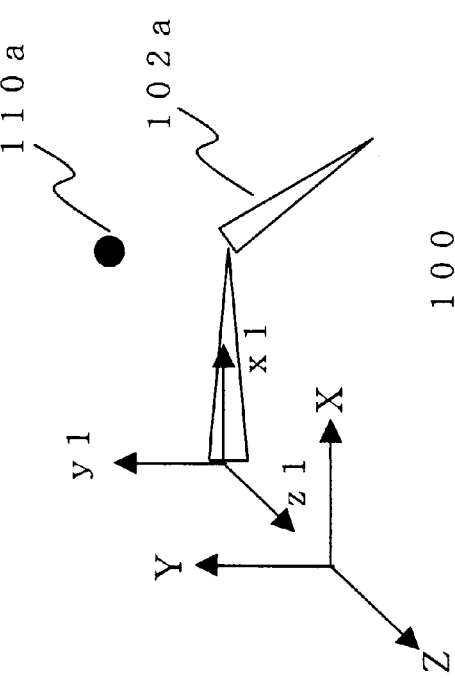
Figure 10B:
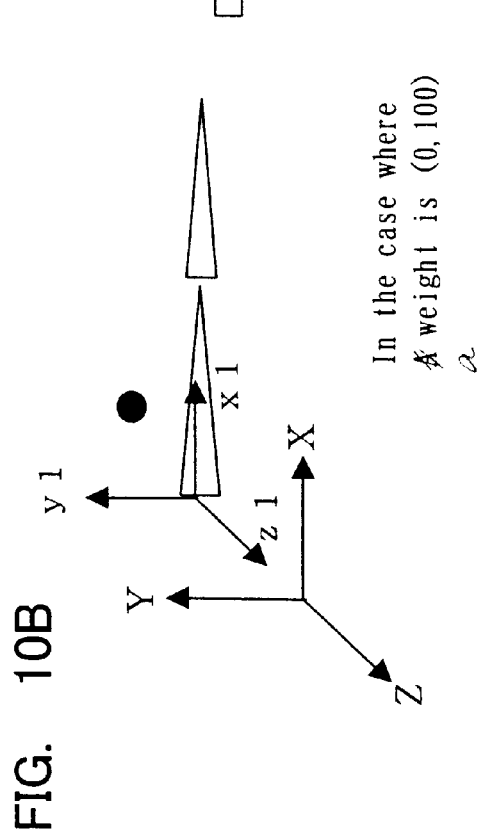

The three-dimensional skeleton data compression apparatus of the present invention can be configured by using various computers by providing a computer-readable recording medium that stores a program describing processing operations for realizing the above-mentioned configuration. Examples of the recording medium storing a program including processing operations for realizing the three-dimensional skeleton data compression apparatus of the present invention include a recording medium 200 in a recording apparatus on the network and a recording medium 205 such as a hard disk and a RAM of a computer, as well as a portable recording medium 201 such as a CD-ROM 202 and a flexible disk 203, as shown in the examples of a recording medium in FIG. 9. In execution, the program is loaded onto a computer 204, and executed on a main memory.

It is understood that various alterations and modifications may be made to the above-mentioned three-dimensional skeleton data compression method and apparatus without departing from the spirit of the present invention. Thus, it should be noted that the present invention is not limited the above-mentioned embodiments.

Industrial Applicability

In a three-dimensional skeleton data compression apparatus of the present invention, a three-dimensional skeleton data amount can be compressed by weight compression processing for reducing weight information that has less influence from three-dimensional skeleton data, first skeleton compression for reducing/compressing skeleton data in which weight information of polygon vertexes is not described, and second skeleton compression in which an integrated skeleton group that has no relative movement in a series of scenes is integrated, thereby reducing/compressing skeleton data. Furthermore, there is substantially no visual degradation of the movement of a three-dimensional character after compression, and natural and smooth movement can be ensured.

Furthermore, in the three-dimensional skeleton data compression apparatus of the present invention, a polygon file that is executable in a three-dimensional polygon data display apparatus can be generated by using three-dimensional skeleton data compressed by weight compression processing and skeleton data compression processing. Furthermore, animation data can be generated as a continuous motion image.

What is claimed is:

1. A three-dimensional skeleton data compression apparatus for compressing and holding skeleton data, used in a three-dimensional polygon display apparatus that renders a three-dimensional character described by polygon data and skeleton data, comprising:

a weight detecting part for detecting weight information that is a numerical value representing a relationship between a skeleton and a polygon vertex and showing a degree of an influence of movement of the skeleton on the vertex, based on input skeleton data;

a weight compression threshold value setting part for setting a weight compression threshold value that is set by a user and used for deleting weight information equal to or lower than the numerical value as the weight information having a small degree of an influence involved in the movement of the skeleton; and a weight compressing part for reducing/compressing weight information equal to or lower than the set weight compression threshold value, among weight information detected by the weight detecting part.

2. A three-dimensional skeleton data compression apparatus according to claim 1, comprising a first skeleton compressing part for reducing/compressing a skeleton having no polygon vertex with a weight value and having no polygon vertex influenced by movement of the skeleton, after the weight compression by the weight compressing part.

3. A three-dimensional skeleton data compression apparatus according to claim 2, wherein the weight detection by the weight detecting part, the weight compression by the weight compressing part, and the skeleton compression by the first skeleton compressing part are conducted on each scene describing a series of movements of a three-dimensional character, and a compressible skeleton having less movement is dynamically determined on each scene to compress skeleton data.

4. A three-dimensional skeleton data compression apparatus according to claim 1, comprising a skeleton relative movement detecting part for detecting relative movement between skeletons and detecting a skeleton group that moves as one body without relative movement, and a second skeleton compressing part for reducing/integrating skeletons, detected by the skeleton relative movement detecting part to be the skeleton group that moves as one body, into a unified and integrated skeleton on a scene basis describing a series of movements of a three-dimensional character, thereby reducing/compressing a number of skeletons.

5. A three-dimensional skeleton data compression apparatus according to claim 3, comprising a skeleton compression mask setting part for specifying a particular skeleton so that it will not be a target for skeleton compression,
wherein, even in a case where the skeleton specified by the skeleton compression mask setting part is determined to be a target for skeleton compression, the specified skeleton is not subjected to the skeleton compression.

6. A three-dimensional skeleton data compression apparatus according to claim 3, comprising a polygon file creating part for sorting and editing polygon data in accordance with a scene progression and a change thereof in a time series, based on skeleton data and polygon data after the skeleton compression, thereby creating a polygon file executable in a three-dimensional polygon display apparatus.

7. A three-dimensional skeleton data compression apparatus according to claim 3, comprising an animation creating part for creating each frame data by executing a rendering based on skeleton data and polygon data after the skeleton compression, followed by sorting in a time series, thereby creating animation data.

8. A three-dimensional skeleton data compression apparatus according to claim 2, comprising a skeleton relative movement detecting part for detecting relative movement between skeletons and detecting a skeleton group that moves as one body without relative movement, and a second skeleton compressing part for reducing/integrating skeletons, detected by the skeleton relative movement detecting part to be the skeleton group that moves as one body, into a unified and integrated skeleton on a scene basis describing a series of movements of a three-dimensional character, thereby reducing/compressing a number of skeletons.

9. A three-dimensional skeleton data compression apparatus according to claim 4, comprising a skeleton compression mask setting part for specifying a particular skeleton so that it will not be a target for skeleton compression,
wherein, even in a case where the skeleton specified by the skeleton compression mask setting part is determined to be a target for skeleton compression, the specified skeleton is not subjected to the skeleton compression.

10. A three-dimensional skeleton data compression apparatus according to claim 4, comprising a polygon file creating part for sorting and editing polygon data in accordance with a scene progression and a change thereof in a time series, based on skeleton data and polygon data after the skeleton compression, thereby creating a polygon file executable in a three-dimensional polygon display apparatus.

11. A three-dimensional skeleton data compression apparatus according to claim 4, comprising an animation creating part for creating each frame data by executing a rendering based on skeleton data and polygon data after the skeleton compression, followed by sorting in a time series, thereby creating animation data.

12. A three-dimensional skeleton data compression apparatus according to claim 8, comprising a skeleton compression mask setting part for specifying a particular skeleton so that it will not be a target for skeleton compression,
wherein, even in a case where the skeleton specified by the skeleton compression mask setting part is determined to be a target for skeleton compression, the specified skeleton is not subjected to the skeleton compression.

13. A three-dimensional skeleton data compression apparatus according to claim 8, comprising a polygon file creating part for sorting and editing polygon data in accordance with a scene progression and a change thereof in a time series, based on skeleton data and polygon data after the skeleton compression, thereby creating a polygon file executable in a three-dimensional polygon display apparatus.

14. A three-dimensional skeleton data compression apparatus according to claim 8, comprising an animation creating part for creating each frame data by executing a rendering based on skeleton data and polygon data after the skeleton compression, followed by sorting in a time series, thereby creating animation data.

15. A computer-readable storage medium storing a processing program for realizing a skeleton data compression apparatus for compressing and holding skeleton data, used in a three-dimensional polygon display apparatus for rendering a three-dimensional character described by polygon data and skeleton data, comprising:
a weight detection processing operation of detecting weight information that is a numerical value representing a relationship between a skeleton and a polygon vertex and showing a degree of an influence of movement of the skeleton on the vertex, based on input skeleton data;
a weight compression threshold value setting processing operation of setting a weight compression threshold value that is set by a user and used for deleting weight information equal to or lower than the numerical value as the weight information having a small degree of an influence involved in the movement of the skeleton;
a weight compression processing operation of reducing/compressing weight information equal to or lower than the set weight compression threshold value, among weight information detected by the weight detection processing operation; and
a first skeleton compression processing operation of reducing/compressing a skeleton having no polygon vertex with a weight value and having no polygon vertex influenced by movement of the skeleton, after the weight compression by the weight compression processing operation.

16. A computer-readable storage medium storing a processing program for realizing a skeleton data compression apparatus for compressing and holding skeleton data, used in a three-dimensional polygon display apparatus for rendering a three-dimensional character described by polygon data and skeleton data, comprising:

a weight detection processing operation of detecting weight information that is a numerical value representing a relationship between a skeleton and a polygon vertex and showing a degree of an influence of movement of the skeleton on the vertex, based on input skeleton data;

a weight compression threshold value setting processing operation of setting a weight compression threshold value that is set by a user and used for deleting weight information equal to or lower than the numerical value as the weight information having a small degree of an influence involved in the movement of the skeleton;

a weight compression processing operation of reducing/compressing weight information equal to or lower than the set weight compression threshold value, among weight information detected by the weight detection processing operation;

a skeleton relative movement detection processing operation of detecting relative movement between skeletons and detecting a skeleton group that moves as one body without relative movement; and a second skeleton compression processing operation of reducing/integrating skeletons, detected by the skeleton relative movement detecting part to be the skeleton group that moves as one body, into a unified and integrated skeleton on a scene basis describing a series of movements of a three-dimensional character, thereby reducing/compressing a number of skeletons.

* * * * *